United States Patent
Kedia et al.

(10) Patent No.: US 10,397,312 B2
(45) Date of Patent: Aug. 27, 2019

(54) AUTOMATED SERVER DEPLOYMENT PLATFORM

(71) Applicant: VISA INTERNATIONAL SERVICE ASSOCIATION, San Francisco, CA (US)

(72) Inventors: Robin Kedia, Singapore (SG); Kathrina Rose Denila Ondap, Singapore (SG); Shi Kai Khiew, Singapore (SG); Girlie Abad Mangalo, Singapore (SG); Samir Mohanty, Singapore (SG); Sachin Cherian Mathew, Singapore (SG)

(73) Assignee: Visa International Service Association, San Francisco, CA (US)

( * ) Notice: Subject to any disclaimer, the term of this patent is extended or adjusted under 35 U.S.C. 154(b) by 259 days.

(21) Appl. No.: 15/381,573

(22) Filed: Dec. 16, 2016

(65) Prior Publication Data

US 2018/0176291 A1   Jun. 21, 2018

(51) Int. Cl.
*H04L 29/08*   (2006.01)

(52) U.S. Cl.
CPC ...... *H04L 67/1002* (2013.01); *H04L 67/1004* (2013.01)

(58) Field of Classification Search
CPC ................. H04L 67/1002; H04L 67/1004
See application file for complete search history.

(56) References Cited

U.S. PATENT DOCUMENTS

| | | | |
|---|---|---|---|
| 8,122,444 B2 | 2/2012 | Greechanik | |
| 8,782,008 B1 * | 7/2014 | Xing | H04L 67/28 707/660 |
| 8,880,679 B2 | 11/2014 | Sharma | |
| 9,319,342 B2 * | 4/2016 | Holkkola | H04L 47/70 |
| 9,742,676 B2 * | 8/2017 | Du | H04L 69/40 |
| 9,772,909 B1 * | 9/2017 | Xing | G06F 11/1469 |
| 9,848,060 B2 * | 12/2017 | Fitzpatrick | H04L 67/1008 |
| 10,097,410 B2 * | 10/2018 | Singh | H04L 41/0813 |
| 10,235,081 B2 * | 3/2019 | Valine | G06F 16/278 |
| 2004/0107273 A1 * | 6/2004 | Biran | H04L 67/1029 709/223 |
| 2006/0179171 A1 | 8/2006 | Stefaniak et al. | |

(Continued)

OTHER PUBLICATIONS

PCT/US2017/057025, "International Search Report and Written Opinion", dated Jan. 10, 2018, 12 pages.

*Primary Examiner* — Lashonda T Jacobs
(74) *Attorney, Agent, or Firm* — Kilpatrick Townsend & Stockton LLP

(57) ABSTRACT

Described herein is a system in which a number of servers in a server pool may be decommissioned without affecting the availability of capabilities provided by that pool of servers. In some embodiments, each server may be assessed with respect to its characteristics and the applications running on that server. In some embodiments, the server may be added to a list of servers to be decommissioned. In some embodiments, each server in the list of candidate servers may be assigned a deactivation score and ordered based on those deactivation scores. An automated decommissioning system may be implemented to decommission servers on a list of servers to be decommissioned and/or based on a deactivation score associated with that server.

20 Claims, 6 Drawing Sheets

(56) References Cited

U.S. PATENT DOCUMENTS

| | | | |
|---|---|---|---|
| 2009/0265771 A1* | 10/2009 | Chung | G06F 21/335 |
| | | | 726/7 |
| 2010/0153524 A1* | 6/2010 | Rehm | H04L 67/1029 |
| | | | 709/221 |
| 2011/0138037 A1* | 6/2011 | Sharma | G06F 9/505 |
| | | | 709/224 |
| 2012/0102185 A1 | 4/2012 | Fernandes | |
| 2012/0290714 A1 | 11/2012 | Cohen | |
| 2013/0198362 A1 | 8/2013 | Abuelsaad | |
| 2014/0130043 A1* | 5/2014 | Mahindru | G06F 9/45558 |
| | | | 718/1 |
| 2015/0317218 A1* | 11/2015 | Verde | G06F 11/2007 |
| | | | 714/4.11 |
| 2016/0119212 A1 | 4/2016 | Pappe et al. | |
| 2016/0335111 A1 | 11/2016 | Mortensen et al. | |
| 2018/0267787 A1* | 9/2018 | Rathinasabapathy | G06F 8/65 |

* cited by examiner

AUTOMATED SERVER DEPLOYMENT PLATFORM

BACKGROUND

Internet-based organizations often maintain a plurality of servers that provide various services to users. Some of these organizations may provide a wide range of services, each of which may require execution of a special-purpose application within the plurality of servers. Due to memory limitations and/or licensing requirements, various special-purpose applications may be installed on only a small subset of servers within the plurality of servers. Many organizations use resource consolidation programs to reduce network operations and maintenance costs, while maintaining network capability and capacity. These resource consolidation programs often manage the decommissioning (either temporary or permanent) of redundant servers within a server pool. Typical resource consolidation programs may rely on operational metrics associated with various servers (e.g., a number of requests received by a server, network traffic received at the server, or an amount of data being processed by the server) to determine whether the server is a good candidate for decommissioning. However, some special-purpose applications may be rarely used, in which case the servers running those applications may be decommissioned based on the operational characteristics associated with those servers. This may ultimately result in the inadvertent unavailability of the special-purpose applications entirely.

Embodiments of the invention address these and other problems, individually and collectively.

BRIEF SUMMARY

Embodiments of the disclosure are directed to a system in which a number of servers in a server pool may be decommissioned without affecting the availability of capabilities provided by that pool of servers. In some embodiments, each server may be assessed with respect to its characteristics and with respect to the applications running on that server. In some embodiments, the server may be added to a list of servers to be decommissioned. If the server remains on this list for a predetermined length of time, the server may be automatically deactivated. In some embodiments, each server in the list of candidate servers may be assigned a deactivation score. The list of candidate servers may then be ordered based on the scores assigned to each candidate server. Upon receiving instructions to deactivate a number of servers, the system may automatically initiate a deactivation sequence for a corresponding number of servers from the list of candidate servers.

One embodiment of the invention is directed to a server apparatus comprising one or more processors, and a memory including instructions that, when executed by the one or more processors, cause the server apparatus to receive an indication of set of servers, identify, for each of the servers in the set of servers, a set of applications running on the server. The instructions may further cause the server to determine, based on a commonality of each application of each set of applications with respect to a sample, a status for the application, determine a deactivation score based on the status for each of the applications in the set of applications for that server, and generate based on the deactivation score for each server.

Another embodiment of the invention is directed to a method comprising receiving, from a server of a plurality of servers, identifiers for each of a set of applications running on the server, and determining a likelihood that each application is a special-purpose application. The method further comprises identifying a subset of the set of applications for which the likelihood that each application in the subset is a special-purpose application is above a predetermined threshold, determining, based on the subset of the set of applications, that the server is a candidate for decommissioning, and providing a notification including an indication that the server should be decommissioned.

These and other embodiments of the invention are described in further detail below.

DETAILED DESCRIPTION

Figure 1:
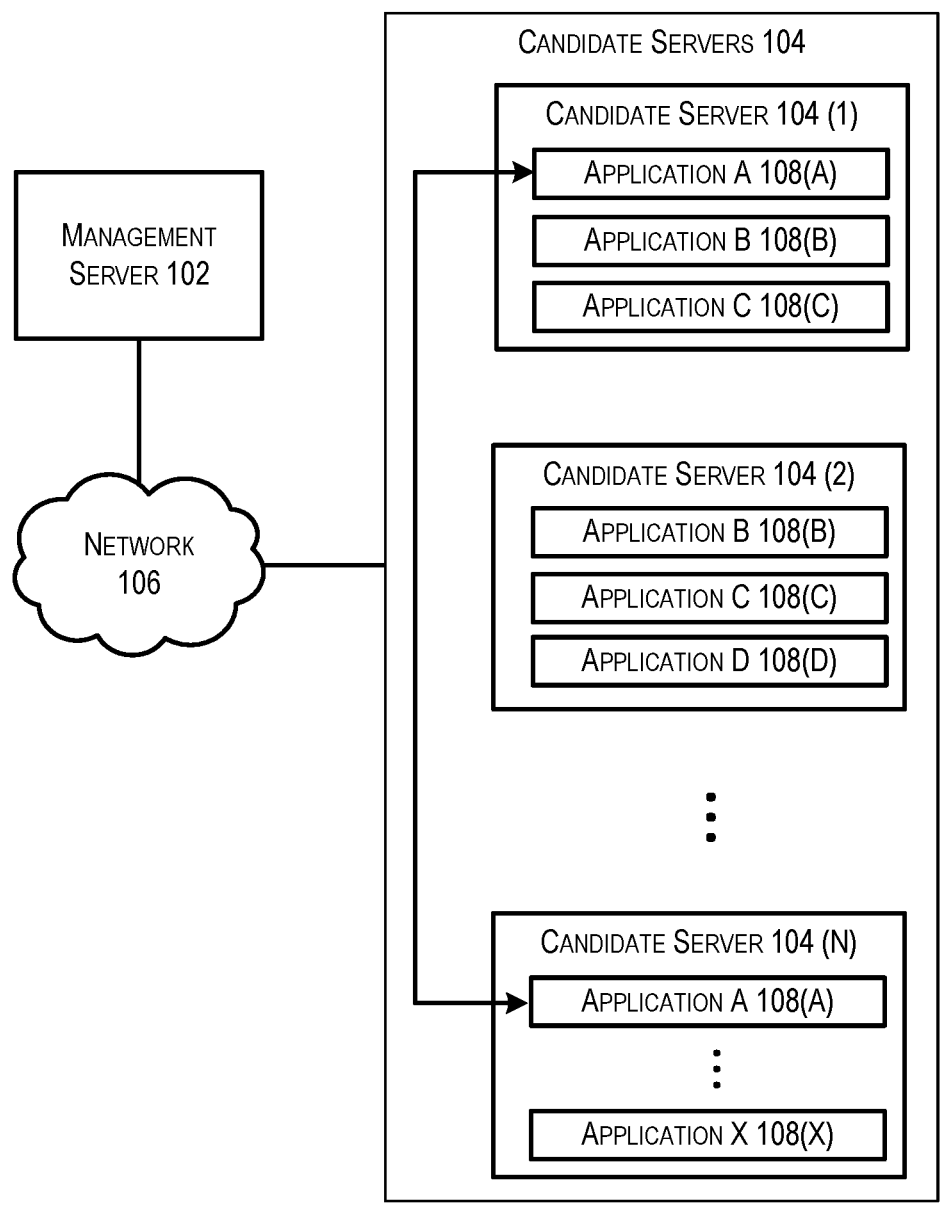
FIG. 1 depicts an illustrative example of a system for identifying and decommissioning candidate servers.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

A "candidate server" may be any server device to be assessed for its suitability for a purpose (e.g., decommissioning). In some embodiments, each server in a pool of servers may be a candidate server (e.g., the system may evaluate each server in the server pool for its suitability for a purpose). In some embodiments, candidate servers may be assessed based on their characteristics, such as the operating system and/or version, the age, the type of server, an amount of traffic, an amount of log in activity, or any other suitable characteristic of the candidate server. In some embodiments, candidate servers may be assessed based on applications and/or resources installed on the candidate servers. Candidate servers may be subjected to any and/or all of the processed described herein.

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

A "deactivation score" may refer to any indication of a device's suitability for deactivation. In some embodiments, a deactivation score may be a binary value (i.e., either 0 or 1) that indicates whether it is suitable for deactivation or not. For example, a candidate server may be subjected to a process that includes a series of decision trees. In this example, the process may result in a binary deactivation score being assigned to the candidate server. In some embodiments, candidates with a deactivation score indicating suitability for deactivation may be added to a list of decommissioning candidate servers. In some embodiments, the deactivation score may be a value in a range of values, such that a system may determine whether one device is more suitable for deactivation than another based on their respective values. For example, the values may range from 0 to 10, with 10 being associated with candidate servers most suitable for deactivation. In some embodiments, the deactivation score may be determined for a candidate server based on characteristics of the candidate server and/or applications and resources available from the candidate server. In some embodiments, candidate servers with a deactivation score that is above or below a threshold value may be decommissioned.

The term "decommission" may refer to any withdrawal of a device from service. Decommissioning a device may be temporary or permanent. In some embodiments, devices may be decommissioned and replaced in order to update an infrastructure or system in which the device is included. In some embodiments, a decommissioning process may consolidate or move processes and/or resources on a device to be deactivated to other devices in the system.

An "ordered list" may be any set of items listed in a specified order. In some embodiments, servers to be decommissioned may be provided via an ordered list which is ordered with respect to a deactivation score for each server. For example, upon assigning a deactivation score to each candidate server in a server pool, the described system may sort the candidate servers based on that deactivation score (either from highest to lowest or from lowest to highest). In this way, the system can quickly and easily identify the candidate server most suitable for decommissioning as being the candidate server next on the list.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "server pool" may refer to any set of server computers. In some embodiments, a server pool may be operated and maintained by a virtual resource provider. In some embodiments, a server pool may comprise a number of servers connected to a common network. Servers in a server pool may be either local or remote. In some embodiments, a server pool may comprise a number of servers physically located within an autonomous region.

A "special-purpose application" may refer to any application intended to provide a specialized function or access to a specialized resource. In some embodiments, distribution of special-purpose applications throughout a server pool may be limited by licensing and/or hardware constraints. In some embodiments, certain applications may be marked as special-purpose applications either manually or automatically via the use of an application assessment process.

A "standard application" may refer to any application that is widely distributed throughout a server pool. Some examples of standard applications may be business-specific applications for a particular organization, firewall applications, antivirus applications, operating systems, or any other suitable commonly distributed application. In some embodiments, certain applications may be marked as standard applications either manually or automatically via the use of an application assessment process.

Details of some embodiments of the present invention will now be described.

FIG. 1 depicts an illustrative example of a system for identifying and decommissioning candidate servers. In FIG. 1, a management server 102 may be in communication with a number of candidate servers 104. In some embodiments, the management server 102 may communicate with the candidate servers 104 via a network connection 106 or via a direct communication channel.

The management server 102 may be any suitable computing device configured to identify and/or decommission candidate servers 104. In some embodiments, the management server 102 may be configured to identify one or more applications 108 (A-X) installed on, and executed from, each of the candidate servers 104. To do this, the management server 102 may be configured to identify each of the applications 108 (A-X) running on a particular candidate server 104 (1-N) and determine whether those applications are special-purpose applications. To determine whether an application is a special-purpose application, the management server 102 may take a random sampling of servers (e.g., candidate servers 104) from a server pool. The management server 102 may be further configured to determine a quantity of servers upon which the application is running from the sampling of servers. If that quantity is over a threshold quantity, then the management server 102 may determine that the application is not a special-purpose application.

In accordance with at least some embodiments, candidate servers 104 may comprise any computing devices configured to provide access to computing resources. Computing resources may comprise webpages, database access, network-based service, or any other suitable resource. In some embodiments, the candidate servers 104 may comprise web servers, application servers, database servers, or any combination of different types of servers. In some embodiments, the computing devices may comprise virtual machines within a distributed network.

In accordance with at least some embodiments, an application may comprise any set of computer-executable instructions that, when executed by a processor, causes a computing device to perform a specified function. In some embodiments, applications may be standard applications or special-purpose applications. Standard applications may be configured to cause performance of functions common to a server or set of servers. For example, an antivirus application installed on a majority of servers in a set of servers may be a standard application. A special-purpose application may be any application configured to cause performance of functions uncommon to a server or set of servers. For example, a special-purpose application may be installed on, and executed from, only a subset of the set of servers. Some examples of special-purpose applications may include department-specific software applications (e.g., a human resource application, an accounting application, etc.). In some embodiments, the special-purpose application may provide access to a resource that is not otherwise accessible.

Although the disclosure refers to servers in a server pool, in some embodiments, a decommissioning process may be performed with respect to a reserved resources in a pool of resources. For example, in a datacenter, resources such as CPU cores, storage, and memory (RAM) may be reserved for a project upon request by a user. However, after some time, at least a portion of the reserved resources may not be used. Based on the data collected with respect to resource usage, the maximum usage can be calculated over a configurable period of time and any additional resources (e.g., resources in excess of those used) can be decommissioned (e.g., returned to the resource pool). For example, during a development phase of a project, a user may request 32 GB RAM. However, once the development phase has been completed, the system may determine that the maximum usage never went above 11 GB during a three-month period. In this example, the system may make a recommendation to retain 16 GB of RAM and return the excess 16 GB of RAM to the common resource pool.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy.

Figure 2:
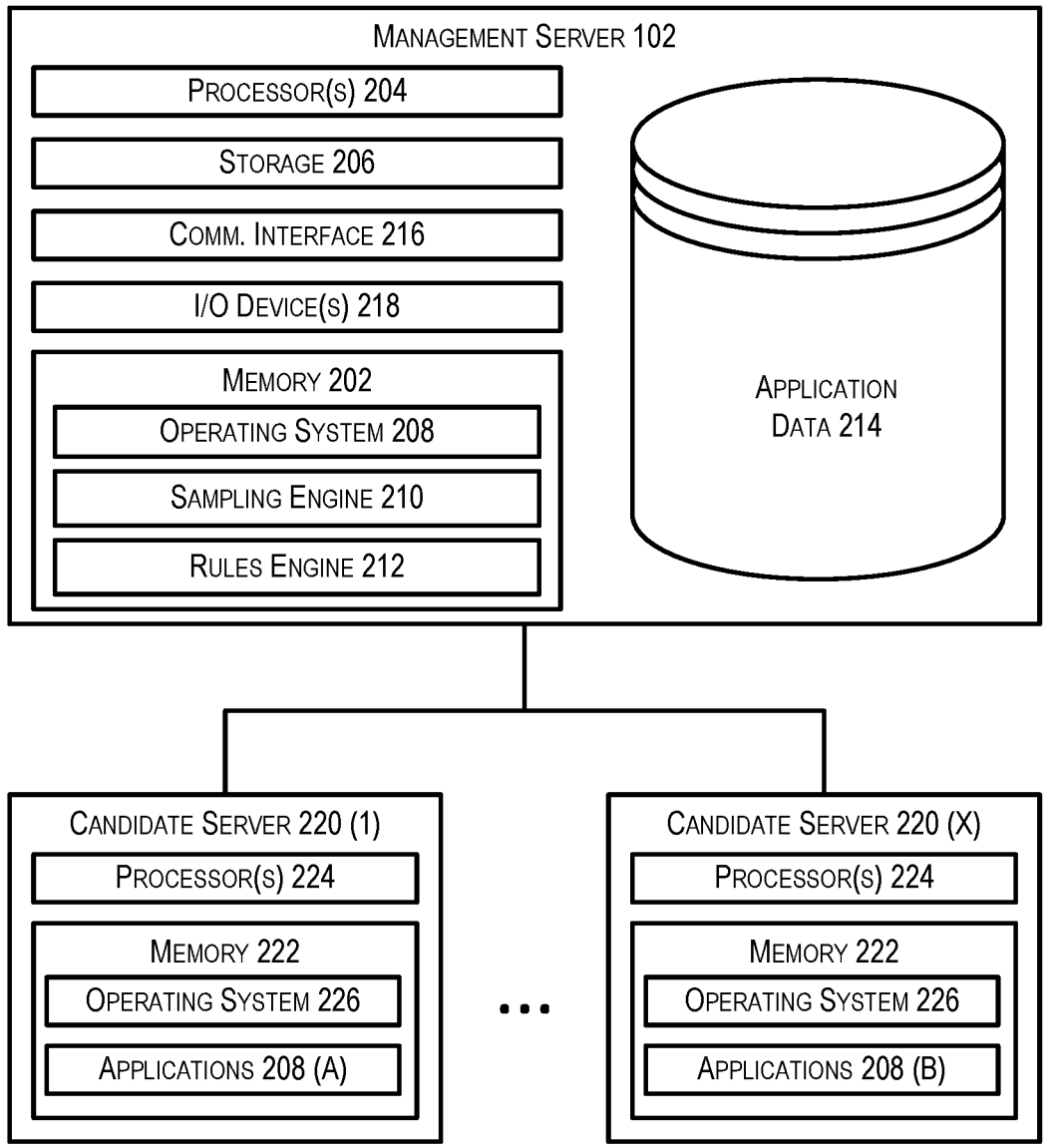
FIG. 2 depicts a diagram of an exemplary management server that may be configured to identify and/or decommission candidate servers in accordance with at least some embodiments.

FIG. 2 depicts a diagram of an exemplary management server 102 that may be configured to identify and/or decommission candidate servers in accordance with at least some embodiments. The management server 102 may be an example management server 102 of FIG. 1.

The management server 102 may be any type of computing device capable of identifying and/or decommission candidate servers. In at least some embodiments, the management server 102 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of management server 102, the memory 202 may be volatile (such as random access memory (RAM)) and/or non-volatile (such as read-only memory (ROM), flash memory, etc.). The management server 102 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the management server 102. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for generating a sample of servers from a server pool (sampling engine 210) and/or a module for identifying decommissioning candidates (rules engine 212). The memory 202 may also include application data 214, which provides data associated with applications.

In some embodiments, the sampling engine 210 may, in conjunction with the processor 204, be configured to identify a sample set of servers from a server pool. In some embodiments, the servers may be selected at random from the server pool. In some embodiments, a set of servers may be selected so that they are representative of a composition of servers in the server pool. For example, the sample of servers may be selected so that it comprises a representational portion of each type of server in the server pool. In some embodiments, the sampling engine 210 may cause the management server 102 to generate a sample set comprising servers of a specific type of server associated with a candidate server 220.

In some embodiments, the rules engine 212 may, in conjunction with the processor 204, be configured to identify server candidates for decommissioning. In some embodiments, the rules engine 212 may determine whether applications installed on, and executed from, a candidate server 220 are special-purpose applications or standard applications. To do this, the rules engine 212 may identify each application installed on the candidate server. The rules engine 212 may then identify, for each application installed on the candidate server, a number of the servers in the sample set of servers on which the application is also installed. In some embodiments, the rules engine 212 may determine whether the number of servers upon which the application is also installed is above a predetermined threshold number of servers. In some embodiments, if the number of servers is above that threshold, then the rules engine 212 may classify the application as a standard application. If the number of servers is below that threshold, then the rules engine 212 may classify the application as a special-purpose application.

The management server 102 may also contain communications interface(s) 216 that enable the management server 102 to communicate with a stored database, another computing device or server, one or more remote devices, other application servers, and/or any other suitable electronic devices. In some embodiments, the communication interface 216 may enable the management server 102 to communicate with other electronic devices on a network (e.g., on a private network). The management server 102 may also include input/output (I/O) device(s) and/or ports 218, such as for enabling connection with a keyboard, a mouse, a pen, a voice input device, a touch input device, a display, speakers, a printer, etc.

The management server 102 may be in communication with a number of candidate servers 220 (1-X). Each candidate server typically will include a memory 222 (e.g., a computer-readable storage medium) storing instructions that, when executed by a processor 224 of the server, allow the server to perform its intended functions and typically will include an operating system 226 that provides executable program instructions for the general administration and operation of that server. Suitable implementations for the operating system and general functionality of the servers are known or commercially available and are readily implemented by persons having ordinary skill in the art, particularly in light of the disclosure herein.

Similar to the management server 102, the memory 222 may include an operating system and a number of applications. In accordance with embodiments of the disclosure, each candidate server of the candidate servers 220 (1-X) may execute a separate set of applications. For example, the first candidate server may include the first set of applications 208 (A) and the second candidate server may include the second set of applications 208 (B). In this example, the first set of applications 208 (A) and the second set of applications 208 (B) may include a subset of overlapping applications. Each of the sets of applications 208 (A and B) may include special-purpose applications and/or standard applications.

Figure 3:
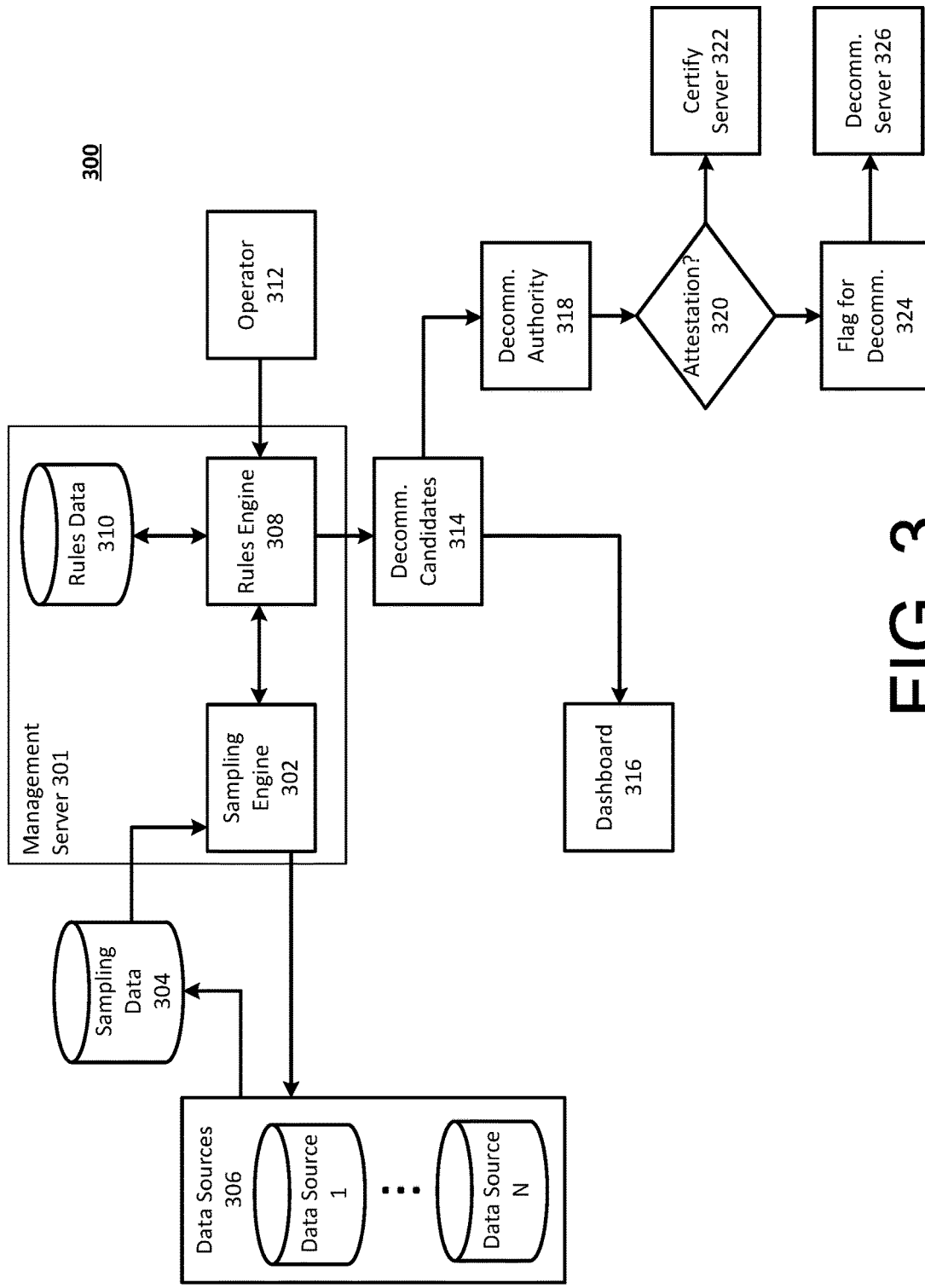
FIG. 3 depicts an illustrative example of a data flow for identifying decommissioning candidates in accordance with embodiments of the disclosure.

FIG. 3 depicts an illustrative example of a data flow for identifying decommissioning candidates in accordance with embodiments of the disclosure. In process 300, a management server 301 may receive instructions to decommission a number of servers in a server pool. In some embodiments, the management server 301 may be provided with a quantity of servers to be deactivated. For example, a number of servers to be maintained in a server pool may be dependent upon a current level of demand for resources maintained by an operator of the server pool. In this example, upon detecting a decrease in traffic (or another suitable indication of decreased demand), the management server 301 may be provided with instructions to deactivate, or decommission, a number of servers in the server pool in order to lower costs associated with maintaining the server pool. In some embodiments, the instructions may be provided by a user via a client device. In some embodiments, the instructions may be provided by an automated decommissioning system.

Once instructions are received by the management server 301 to deactivate a number of servers, the management server 301 may use process 300 to identify and decommission a quantity of servers that corresponds to the number of servers to be deactivated. To initiate process 300, the management server 301 may activate a sampling engine 302. Upon activation, the sampling engine 302 may generate a set of sampling data 304 from a set of data sources 306. The set of data sources may comprise a number of servers that provide a variety of resources.

Once the sampling engine 302 has generated sampling data 304, management server 301 may activate a rules engine 308 to identify deactivation targets within the set of data sources 306. To do this, the rules engine 308 may use a set of rules 310. In some embodiments, the rules may be set by an operator entity 312. In some embodiments, the set of rules 310 may include a number of data values to be associated with decommissioning candidates 314. In some embodiments, the list of decommissioning candidates may comprise an ordered list of the servers in a server pool. For example, the rules engine 308 may calculate, using the rules 310 and/or associated processes, a deactivation score for each of the servers in a server pool that indicates that server's suitability for deactivation. In this example, the servers may then be aggregated into an ordered list according to their deactivation score. The rules engine 302 may identify candidate servers for deactivation using techniques described herein. In some embodiments, candidate servers that are assigned a deactivation score above or below a threshold value may be added to a list of servers to be decommissioned. For example, upon determining that a deactivation score for a particular candidate server is 9.1, and the threshold value is 9.0, the system may automatically initiate a decommissioning process upon calculating the deactivation score (assuming that servers over the threshold value are decommissioned).

In some embodiments, once a set of decommissioning candidates 314 has been identified, information related to the set of decommissioning candidates 314 may be provided to a dashboard 316. In some embodiments, the dashboard 316 may comprise a graphical user interface (GUI) installed on, and executed from, a client device. The dashboard 316 may be installed on a client device that is remote to the management server 301 depicted. In some embodiments, additional information related to each of the servers of the data sources 306 may be provided to a user via the dashboard 316.

In some embodiments, a notification of any identified decommissioning candidates may be provided to a decommissioning authority 318 before being decommissioned. For example, a list of servers identifiers may be compiled and provided to the decommissioning authority. In some embodiments, the decommissioning authority may determine whether each of the decommissioning candidates in the set of decommissioning candidates should be deactivated. In some embodiments, the decommissioning authority 318 may comprise an automated system configured to initiate a shutdown or suspension procedure for each of the decommissioning candidate servers in the set without further interaction from a user.

In some embodiments, the decommissioning authority 318 may notify a user (e.g., an administrator) of the servers on the list during an attestation process 320. The decommissioning authority may identify a subset of the servers within the list of candidate servers that are mission critical. For example, the decommissioning authority may maintain a list of servers that are not to be deactivated. In this example, the decommissioning authority may remove servers from the list of candidate servers. In another example, a user or administrator may manually examine the list of candidate servers. Upon identifying servers that should not be deactivated, the user may mark those servers as such. Once these servers are marked in this manner, they may receive a certificate 322 so that further decommissioning efforts will not identify the certified servers. Upon determining that the list of candidate servers is accurate, each of the servers on the list may be flagged for decommissioning (324) and/or subsequently decommissioned (326). In some embodiments, servers on the list of decommissioning candidates may be deactivated automatically based on an amount of time that the candidate server has been on the list. For example, if the candidate server remains on the list for a threshold amount of time without being removed or flagged for removal, then a decommissioning process may be initiated automatically for that server. By way of illustration, each candidate server that remains on a decommissioning list for at least 90 days (the number of days may be configured) will be decommissioned. During that time, a user (e.g., an administrator) may remove the server from the decommissioning list.

Figure 4:
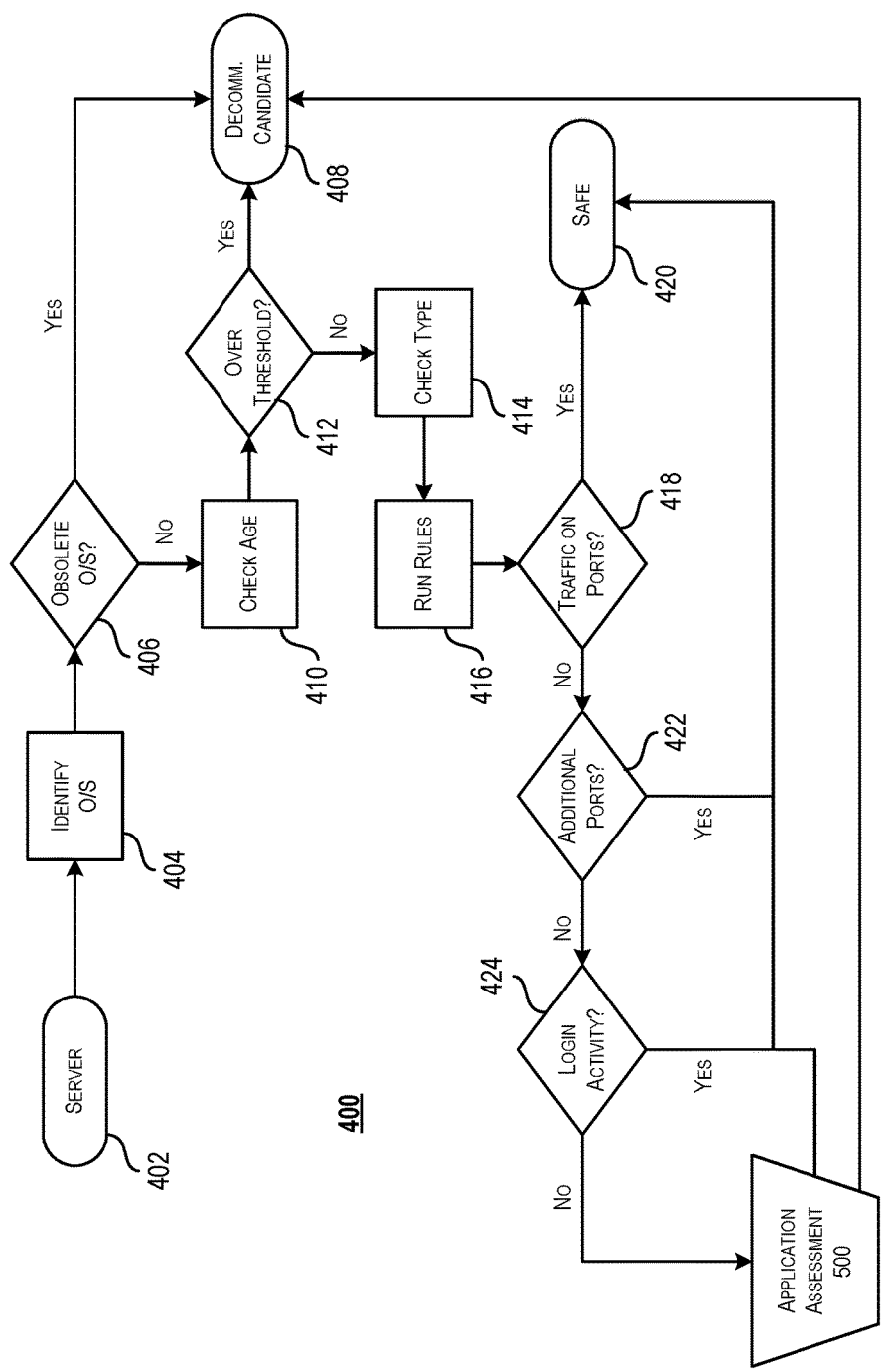
FIG. 4 depicts an illustrative example of a server assessment process that may be performed in order to identify candidate servers for decommissioning.

FIG. 4 depicts an illustrative example of a server assessment process that may be performed in order to identify candidate servers for decommissioning. In accordance with at least some embodiments, the server assessment process 400 may be performed by a rules engine of a management server, such as rules engine 212 of management server 102 depicted in FIG. 2.

In accordance with at least some embodiments, server assessment process 400 may be performed when the management server receives an indication of a server at 402, For example, the management server may receive a server identifier, a server address, or any other suitable indication of the server. In some embodiments, the server may be one that is being considered for potential deactivation. In some embodiments, the management server may periodically assess each server in a pool of servers to generate a list of decommissioning candidates. In some embodiments, the list of decommissioning candidates may be an ordered list (i.e., the servers may be listed in the order in which they should be deactivated). The server assessment process 400 may assess a server based on various characteristics of that server as well as based on applications running on that server.

In some embodiments, the server assessment process 400 may initially identify an operating system installed on the candidate server at 404. Upon identifying the operating system installed on the candidate server, the server assessment process 400 may determine whether the operating system is obsolete. For example, the management server may maintain an indication of a current operating system to be installed on each server as well as a version of that operating system. In some embodiments, if the server is operating an inappropriate operating system it may be flagged for decommissioning at 408. In some embodiments, the management server may maintain a list of operating systems and versions, each associated with a deactivation score. In these embodiments, the server may be assigned an initial deactivation score based on the operating system and version installed on that server.

In some embodiments, the server assessment process 400 may check the age of the candidate server at 410. In some embodiments, the age may be determined from a directory that maintains an age or activation date for each of the servers in a server pool. In some embodiments, an age of the server may be determined from a model or version of the server. In some embodiments, the server assessment process 400 may flag a server for decommissioning at 412 if the server is over a threshold age. In some embodiments, the server assessment process 400 may update a deactivation score associated with the server based on the age of the server, such that its suitability for deactivation corresponds to its age (e.g., older servers may be more suitable for deactivation).

The server assessment process 400 may identify a type of server that is being assessed at 414. For example, the server may be a web server, an application server, a database server, or any other suitable type of server. Based on the identified type associated with the server, the management server may identify a set of rules to be applied with respect to the server at 416. In some embodiments, the rules may comprise a number of type-specific requirements. For example, a web server may be assessed based on a number of webpages served. Upon running the rules to assess the candidate server, a deactivation score associated with the candidate server may be updated.

In some embodiments, the server assessment process 400 may assess an amount of traffic over commonly used ports. The management server may maintain a list of ports commonly used by its services. For example, the server assessment process may initially identify levels of traffic over standard ports 80, 8080, 443, and 8443. In some embodiments, if a level of traffic over each of these ports is over a threshold level, then the server assessment process may determine that the server is not a decommissioning candidate. Likewise, if the level of traffic over each of these ports is below a threshold level, then the server assessment process may determine that the server is a decommissioning candidate. Additionally, the server assessment process may assess an amount of traffic over uncommonly used ports at 422. For example, the server assessment process may test various ports associated with the candidate server to determine if any additional ports are in use. In some embodiments, the server assessment process may update a deactivation score associated with the server based on the level of traffic identified over various ports. In some embodiments, the deactivation score may be updated based on the number/levels of traffic for each port. For example, if traffic is detected over an uncommonly used port, then there is a higher likelihood that the server is running a special-purpose application and the management server may adjust its deactivation score to be weighed against deactivation.

In some embodiments, the server assessment process 400 may determine that one or more additional ports in use represent a security threat and may close that port or recommend closing the additional port. For example, upon detecting that a particular additional port is open on the candidate server, the management server may determine an amount of time over which the port has been open and/or an amount of traffic transmitted via the additional port. In some embodiments, if one or more of these amounts meets predetermined conditions, then the management server may provide a recommendation to close the port.

In some embodiments, the server assessment process 400 may also assess an amount of log in activity for the candidate server at 424. In some embodiments, servers associated with an amount of log in activity above a threshold amount may be determined to be unsuitable for deactivation, whereas servers associated with an amount of log in activity below the threshold amount may be determined to be added to a list of potential decommissioning candidates. In some embodiments, the type of user who logs in may be used to determine if the server is suitable for deactivation. For example, if the only users who log in are system administrators (no normal users), then it could be assumed that the users are logging in only for maintenance purposes and the server may be suitable for deactivation. In some embodiments, a deactivation score associated with the candidate server may be updated based on the level of log in activity associated with the candidate server. In some embodiments, a deactivation score associated with the candidate server may be updated based on the type of user who logs in to candidate server.

In some embodiments, the server assessment process 400 may also assess applications installed on the server. To do this, the server assessment process may execute an application assessment process 500 as described with respect to FIG. 5 below. In some embodiments, the server assessment process may receive a deactivation score from the application assessment process and may combine that deactivation score with a deactivation score calculated using the server assessment process.

It should be noted In some embodiments, the process 400 may return a binary result. For example, the process 400, when initiated, may return an indication of whether a server should be deactivated or remain active. In this example, the process 400 may indicate that the server should remain active based on the assessment depicted in FIG. 4. In some embodiments, the process 400 may instead return a deactivation score associated with the server. For example, the process 400 may return a deactivation score (or other suitable value) that indicates a server's suitability for deactivation. In this example, a list of servers may be ordered according to these deactivation scores such that each server's position within the list indicates its suitability for deactivation. In some embodiments, the candidate servers on the list of servers to be decommissioned may be decommissioned automatically upon determining that the server has been on the list for over a threshold amount of time. In some cases, a user may be given the ability to remove a server from the list. In some embodiments, a decommissioning process may be initiated upon completion of any suitable condition. For example, a deactivation process may be initiated for a server upon determining that a deactivation score associated with the server is above or below a predetermined value.

Although FIG. 4 depicts a number of arrows, it should be noted that this is merely an example of a process that may be implemented using the disclosure. It is intended that the various elements described with respect to process 400 may be implemented in any order. In some embodiments, various elements depicted in the process may be omitted entirely. It is also envisioned that process 400 may include a number of additional elements that are not depicted. For example, other characteristics of a candidate server that are not listed here may also be considered when scoring it.

Figure 5:
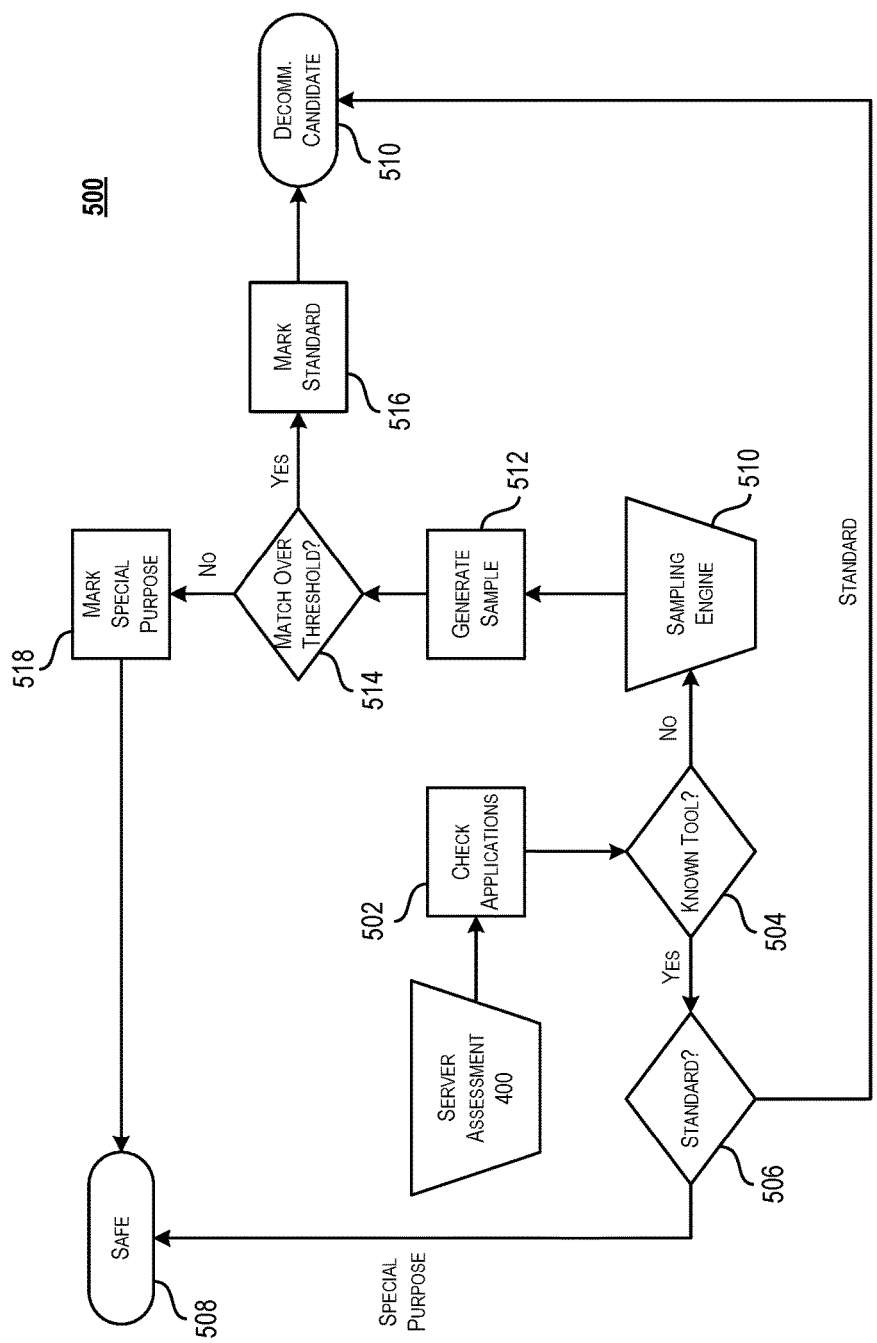
FIG. 5 depicts an illustrative example of an application assessment process that may be performed in order to identify candidate servers for decommissioning.

FIG. 5 depicts an illustrative example of an application assessment process that may be performed in order to identify candidate servers for decommissioning. In accordance with at least some embodiments, the application assessment process 500 may be performed by a rules engine of a management server, such as rules engine 212 of management server 102 depicted in FIG. 2. In some embodiments, the application assessment process 500 may be initiated within a server assessment process 400 with respect to a server as depicted in FIG. 4.

In some embodiments, process 500 may begin by checking for applications running on the server at 502. To do this, each application running on the server is discovered and added to a set. Each application in the set may then be assessed in order to determine whether it is a special purpose application or a standard application in the following manner.

The application is first compared to a set of known tools at 504. The set of known tools may be stored in memory of the management server and may include a set of known special-purpose and standard applications. As new standard and/or special-purpose applications are discovered, they may be added to the set of known tools by the management server. In some embodiments, the set of known tools may be edited or updated by a user (e.g., an administrator). If the application to be assessed is found in the set of known tools, then the process 500 may determine whether it is a standard application or a special-purpose application at 506. In some embodiments, if the application is a special-purpose application the management server may mark the server as "safe" from deactivation at 508. In some embodiments, the management server may associate a deactivation score or weight to each decommissioning candidate server that it assesses. In these embodiments, the determination that the application is a special-purpose application may cause the management server to weigh against deactivation of the server. For example, the management server may associate a deactivation score with each server that it assesses such that a high deactivation score would indicate a good candidate for deactivation and a low deactivation score would indicate a bad candidate for deactivation. In this example, upon determining that an application running on the candidate server is a special-purpose application, the deactivation score associated with the candidate server may be decreased. Upon determining that the application is a known standard application, the management server may begin assessing the next application in the set of applications.

Upon determining that the application being assessed is not in a set of known tools, the process 500 may initiate a sampling engine at 510. However, in some embodiments, it should be noted that the sampling engine may be initiated separate from the process 500. The sampling engine may be configured to generate a sample set of servers at 512. In some embodiments, the servers in the sample set of servers may be selected at random from an available server pool. In some embodiments, a set of servers may be selected so that they are representative of a composition of servers in the server pool. For example, the sample of servers may be selected so that it comprises a representational portion of each type of server available in the server pool. It should be noted that, in some embodiments, the same sample set of servers may be used to evaluate each application in the set of applications to be assessed on the server. In some embodiments, a sample set may be generated by the sampling engine on a periodic basis (e.g., monthly, daily, hourly, etc.), which may be used to assess applications.

For each application, the process 500 may identify a number of matches from the servers in the sample set of servers (i.e., servers on which the application is also installed). In some embodiments, the management server may determine whether the number of matches is above a predetermined threshold number of servers at 514. In some embodiments, if the number of matches is above that threshold, then the management server may classify the application as a standard application at 516. In some embodiments, this may subsequently result in the management server adjusting a deactivation score associated with the server toward deactivation. In some embodiments, a determination that the application is a standard application may result in no change to a deactivation score associated with the server. If the number of matches is below the threshold, then the management server may classify the application as a special-purpose application at 518. In some embodiments, this may subsequently result in the management server adjusting a deactivation score associated with the server away from deactivation. In some embodiments, once the application has been identified as either a standard application or a special-purpose application, the set of known tools maintained by the management server may be updated to reflect this identification. In some embodiments, applications that are maintained in the set of known tools may be periodically re-tested in order to determine if their status has changed.

In some embodiments, the application may not be marked standard or special-purpose, but may instead be associated with a value or deactivation score. For example, if Application A is installed on 60% of the servers in the sample set, it may be assigned a deactivation score that is correlated to that percentage (e.g., 0.6). In this example, the management server may assess the rarity/commonality of each of the applications installed on a server being assessed in order to calculate an overall deactivation score for the server. In this example, each server assessed in this way may be ordered (e.g., in an ordered list) such that the management server may identify a number of suitable decommissioning candidates. By way of illustration, each server in a server pool may be assigned a deactivation score based on the applications installed on that server. The servers in the server pool may then be ordered according to their assigned deactivation scores. Upon determining that X number of servers of the server pool need to be deactivated, the management server may identify the top X candidate servers in the ordered list of candidate servers and deactivate those servers. In some embodiments, the ordered list may be generated or updated on a periodic basis.

In some embodiments, process 500 may be repeated until each of the applications on a server have been assessed. For example, elements 504 through 518 may be applied to each of the applications in the set of applications identified at element 502. In some embodiments, the process 500 may return a binary result. For example, the process 500, when initiated, may return an indication of whether a server should be deactivated or remain active. In this example, the process 500 may indicate that the server should remain active if it detects one or more special-purpose applications running on a server. In some embodiments, the process 500 may return a deactivation score associated with the server. For example, the process 500 may return a value that indicates a server's suitability for deactivation.

By way of illustration, consider an example in which one or more servers in a set of servers includes Application A, Application B, and/or Application C. In this example, the application assessment process described with respect to FIG. 5 may be used to determine that Application A is installed on 30% of the servers in a sample set, Application B is installed on 45% of the servers in the sample set, and Application C is installed on 65% of the servers in the sample set. In some embodiments using this example, the application assessment process may identify a threshold, such that each application with an occurrence rate over that threshold is considered standard. For example, the application assessment process may identify a threshold of 60%, such that Applications A and B are considered special-purpose and Application C is considered standard. It should be noted that a value of the threshold may vary. For example, a different threshold value may be selected based on a type of server being assessed. In other embodiments using this example, the application assessment process may calculate a deactivation score for the server based on the applications. For example, the application assessment process may calculate a deactivation score using the formula:

$$\text{Deactivation Score} = \frac{0.30 * P_A}{P_T} + \frac{0.45 * P_B}{P_T} + \frac{0.65 * P_C}{P_T}$$

Wherein $P_X$ represents the processing power used by each of the respective Applications A, B, and C, and $P_T$ represents the total processing power used by the server. In some embodiments, the deactivation score may also account for the total processing power available to the server. For example, the application assessment process may determine what portion of the server's processing capabilities are being utilized, with servers having lower utilization weighted toward deactivation.

Figure 6:
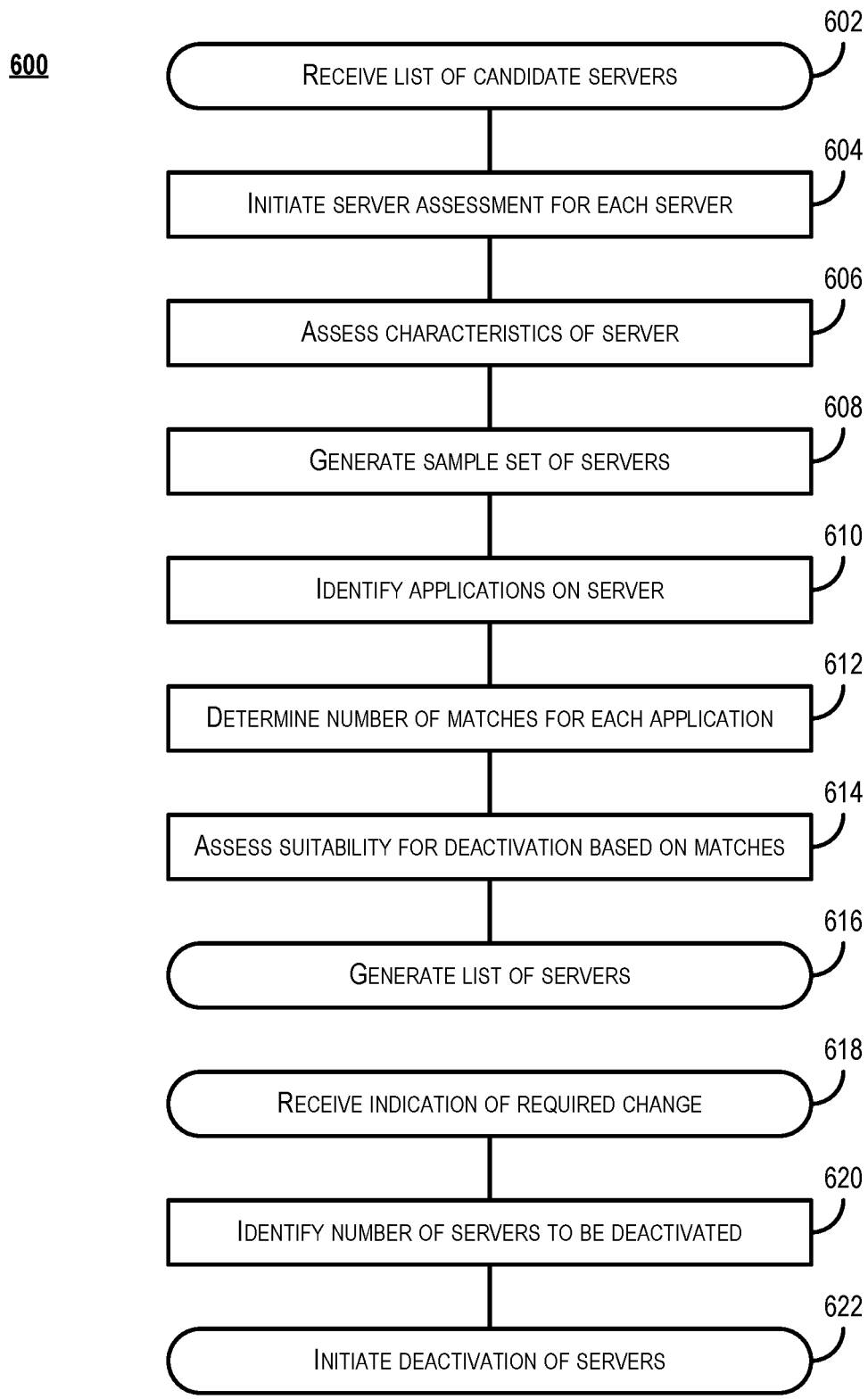
FIG. 6 depicts an illustrative flow diagram of a process for identifying and/or deactivating decommissioning candidates in accordance with embodiments of the disclosure.

FIG. 6 depicts an illustrative flow diagram of a process for identifying and/or deactivating decommissioning candidates in accordance with embodiments of the disclosure. Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more management servers 102 depicted in FIG. 2. The code may be stored on a computer-readable storage medium, for example, in the form of a computer program including a plurality of instructions executable by one or more processors. The computer-readable storage medium may be non-transitory.

In some embodiments, process 600 may begin at 602, when a list of decommissioning candidate servers is received. In some embodiments, the list of decommissioning candidate servers may comprise a list of all of the servers in a server pool. In some embodiments, the system may automatically initiate process 600 on a periodic basis in order to generate or update a list of potential decommissioning targets.

At 604, the process may initiate a server assessment process for each server in the list of candidate servers. In some embodiments, the server assessment process may generate a list of candidates that are suitable for decommissioning (i.e., unsuitable candidates are not included in the list). In at least some of these embodiments, the management server may be provided with a deactivation target (e.g., a number of servers to be decommissioned) and the process 600 may identify a corresponding number of servers. In some embodiments, the server assessment process may generate a deactivation score for each server in the candidate server list and the list may subsequently be ordered in relation to the deactivation scores.

At 606, characteristics with each server may be assessed via a server assessment process. For example, the server assessment process may assess the operating system and/or version, the age, the type of server, an amount of traffic, an amount of log in activity, or any other suitable characteristic of the candidate server. In some embodiments, the server assessment process may comprise a series of decision trees in which the candidate server may be flagged as a decommissioning candidate or flagged as being unsuitable for decommissioning (e.g., the process 400 depicted in FIG. 4). In some embodiments, the server assessment process may be used to generate a deactivation score for the candidate server being assessed.

At 608, the process may generate a sample set of servers. In some cases, the sample set of servers may be generated separate from the server assessment process. For example, a sample set of servers may be generated on a periodic basis. In some embodiments, a sample set of servers may be generated each time that the server assessment process is to be initiated. The sample set of servers may be randomly selected. In some embodiments, the sample set of servers may be generated so that it is representative of the server pool. For example, servers may be added to the sample set of servers so that the quantity of each type of server in the sample set of servers remains proportional to the respective quantity of that type of server within the server pool.

In some embodiments, server assessment process may initiate an application assessment process. In this process at 610, the management server may, via a discovery process, identify each of the applications running on the candidate server. As an initial step, the application assessment process may determine, for each of the identified applications running on the server, whether or not the application is a known tool. In this example, a set of known tools may be maintained, such that the management server is able to identify a status associated with each of the known tools. However, if there is no current status associated with the application (or if the current status should be updated), then the following steps may be taken.

At 612, the process may determine a number of matches for each of the identified applications running on the candidate server from the sample set of servers. For example, the process may determine a number of servers within the sample set of servers upon which the application is also running. In some embodiments, based on whether this number of servers (e.g., matches) is above or below a threshold number of servers, the application may be classified as either a special-purpose application or a standard application. Once classified, the application may be added to the set of known tools in order to speed up future processes. In some embodiments, the application assessment process may record an occurrence percentile associated with each application.

At 614, the process may assess a suitability of each candidate server for deactivation. In some embodiments, the application assessment process may be used to calculate a deactivation score for the server based on the identified applications and their associated matches. The deactivation score may be calculated based on a number of occurrences for each of the applications running on the server as well as various characteristics of the server. In some embodiments, a server may be identified as being suitable for deactivation upon determining that the server is not running any special-purpose applications (e.g., each application running on the server had been identified as being a standard application).

At 616, the process may generate a list of servers. In some embodiments, the list of servers may include only those servers that have been identified as suitable for deactivation. In some embodiments, the list of servers may comprise an ordered list of each server in the server pool, wherein the list is ordered in relation to a deactivation score.

Process 600 may include automated deployment/deactivation of a number of servers. At 618, the process may receive an indication of a required change. For example, the management server may receive an indication that demand for a resource (e.g., webpages) has declined or is otherwise currently low. In order to lower costs, the management system may determine that some servers in a server pool should be deactivated.

At 620, the process may determine, based on the required change, a number of servers to be deactivated. In some embodiments, the number may be determined with respect to a particular type of server or resource. For example, if a decline in demand pertains to a particular resource, then servers that provide access to that resource may be deactivated. In some embodiments, the number of servers may comprise servers of a combination of different server types. In some embodiments, the number of servers to be deactivated may be determined by calculating a number of servers required to meet current demand levels and subtracting that number from a number of servers that are currently active.

At 622, the process may initiate deactivation of a number of servers. In some embodiments, the deactivation of the number of servers may be initiated automatically (i.e., without further interaction from a user). In some embodiments, if a server remains on the list of servers generated by process 600 for a predetermined period of time without being removed or certified, then a decommissioning process may be initiated for that server automatically. In some embodiments, the list may comprise a list of each of the servers in a server pool ordered with respect to that server's suitability for deactivation (e.g., by deactivation score). In this example, upon receiving, at an automated system, instructions to deactivate a number of servers, the automated system may initiate a decommissioning process for a corresponding number of servers on the ordered list in the specified order. In embodiments that utilize an ordered list, instructions to deactivate a particular type of server may cause the automated system to identify only those servers of that type in the automated list to be deactivated.

Embodiments of the invention provide for a number of technical advantages. For example, typical resource shedding systems do not account for the capabilities of the server pool as a whole. Embodiments of the current disclosure allow for an automated system to deactivate servers while maintaining the availability of special-purpose applications and resources. Additionally, as information is collected with respect to each application (e.g., whether the application is special-purpose or standard, or the percentage of matches for the application), the described system increases in efficiency (as the process can be resolved at an earlier stage). Accordingly, the described system results in a system that is more fully capable of deactivating servers in an automated manner while maintaining current capabilities than current systems.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include an interaction record which indicates that a ticket has been associated with an account.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server apparatus comprising:
    one or more processors; and
    a memory including instructions that, when executed by the one or more processors, cause the server apparatus to:
        receive an indication of set of servers;
        identify, for each of the servers in the set of servers, a set of applications running on the server;
        select a sample of servers from the set of servers;
        identify, for each of the servers in the sample of servers, a number of applications executing on the server;
        assign, to each of the number of applications executing on the server, a commonality that corresponds to a number of servers from the sample of servers on which that application is being executed;
        determine, based on the commonality of each application of the number of applications with respect to the sample of servers, a status for the application;
        determine, for each server in the set of servers, a deactivation score based on the status for each of the applications in the set of applications for that server; and
        generate, based on the deactivation score for each server in the set of servers, a list of servers.

2. The server apparatus of claim 1, wherein the list includes only servers suitable for deactivation.

3. The server apparatus of claim 2, wherein the servers in the list are deactivated automatically after remaining on the list for a predetermined period of time.

4. The server apparatus of claim 3, wherein the list is an ordered list, the order determined based on the deactivation score.

5. The server apparatus of claim 4, wherein the instructions further cause the server apparatus to:
    receive an indication of a quantity of servers to be deactivated; and
    deactivate the quantity of servers from the list in the order in which the servers are listed.

6. The server apparatus of claim 5, wherein the server apparatus also receives an indication of at least one type of server, and the quantity of servers is of the indicated type.

7. The server apparatus of claim 1, wherein the commonality is determined based on a percentage of servers from the sample upon which the application is running.

8. The server apparatus of claim 1, wherein the status is one of special-purpose or standard.

9. The server apparatus of claim 1, wherein the deactivation score is determined for each server based on an amount of processing being performed with respect to each of the applications in the set of applications.

10. The server apparatus of claim 1, wherein the sample is generated from a server pool that includes all available servers.

11. The server apparatus of claim 10, wherein the sample is representative of server types in the server pool.

12. The server apparatus of claim 1, wherein a user is able to edit the servers of the list of servers.

13. A method comprising:
    generating a sample set of servers from the plurality of servers;
    identifying, for each of the servers in the sample set of servers, a number of applications executing on the server;
    assigning, to each of the number of applications executing on the server, a commonality that corresponds to a number of servers from the sample set of servers on which that application is being executed;
    receiving, from a server of a plurality of servers, identifiers for each of a set of applications running on the server;
    determining, for each application in the set of applications, a likelihood that the application is a special-purpose application based on a commonality associated with that application;
    identifying a subset of the set of applications for which the likelihood that each application in the subset is a special-purpose application is above a predetermined threshold;
    determining, based on the subset of the set of applications, that the server is a candidate for decommissioning; and
    providing a notification including an indication that the server should be decommissioned.

14. The method of claim 13, wherein determining the likelihood that the application is a special-purpose application comprises:
    comparing the commonality assigned to the application to a threshold commonality value.

15. The method of claim 14, wherein the application is determined to be a special-purpose application if the commonality assigned to the application is below the threshold commonality value.

16. The method of claim 13, further comprising:
    receiving, from a user, a permission to decommission the server; and
    initiating a decommissioning process for the server.

17. The method of claim 13, wherein the indication that the server should be decommissioned is provided via a list of servers to be decommissioned.

18. The method of claim 17, wherein the server is removed from the list of servers to be decommissioned upon being certified.

19. The server apparatus of claim 9, wherein the deactivation score comprises a sum of the commonality of each application multiplied by amount of processing being performed by that application divided by a total amount of processing being performed by the server.

20. The server apparatus of claim 1, wherein the sample of servers is selected from the set of servers at random.

* * * * *